UNITED STATES PATENT OFFICE.

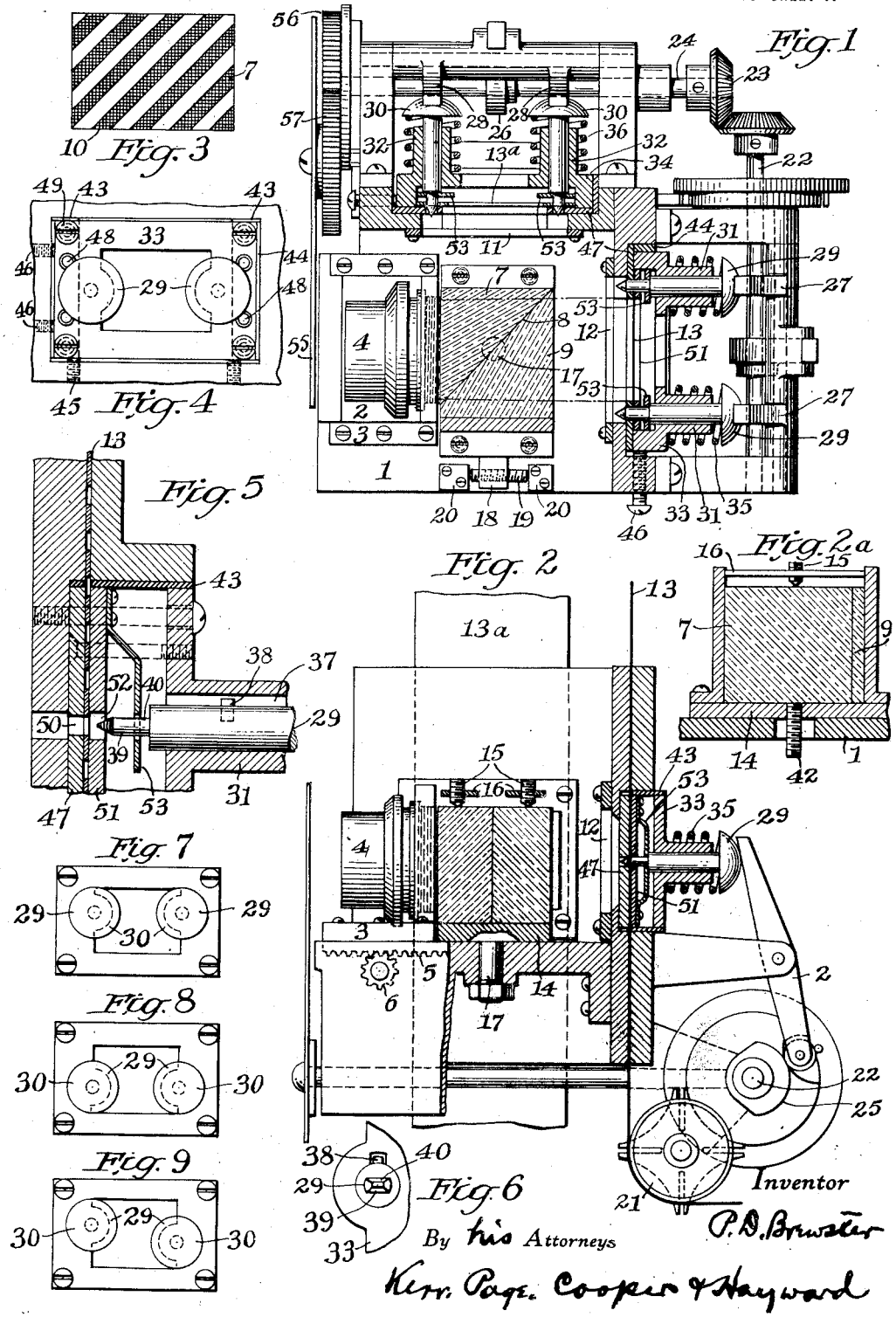

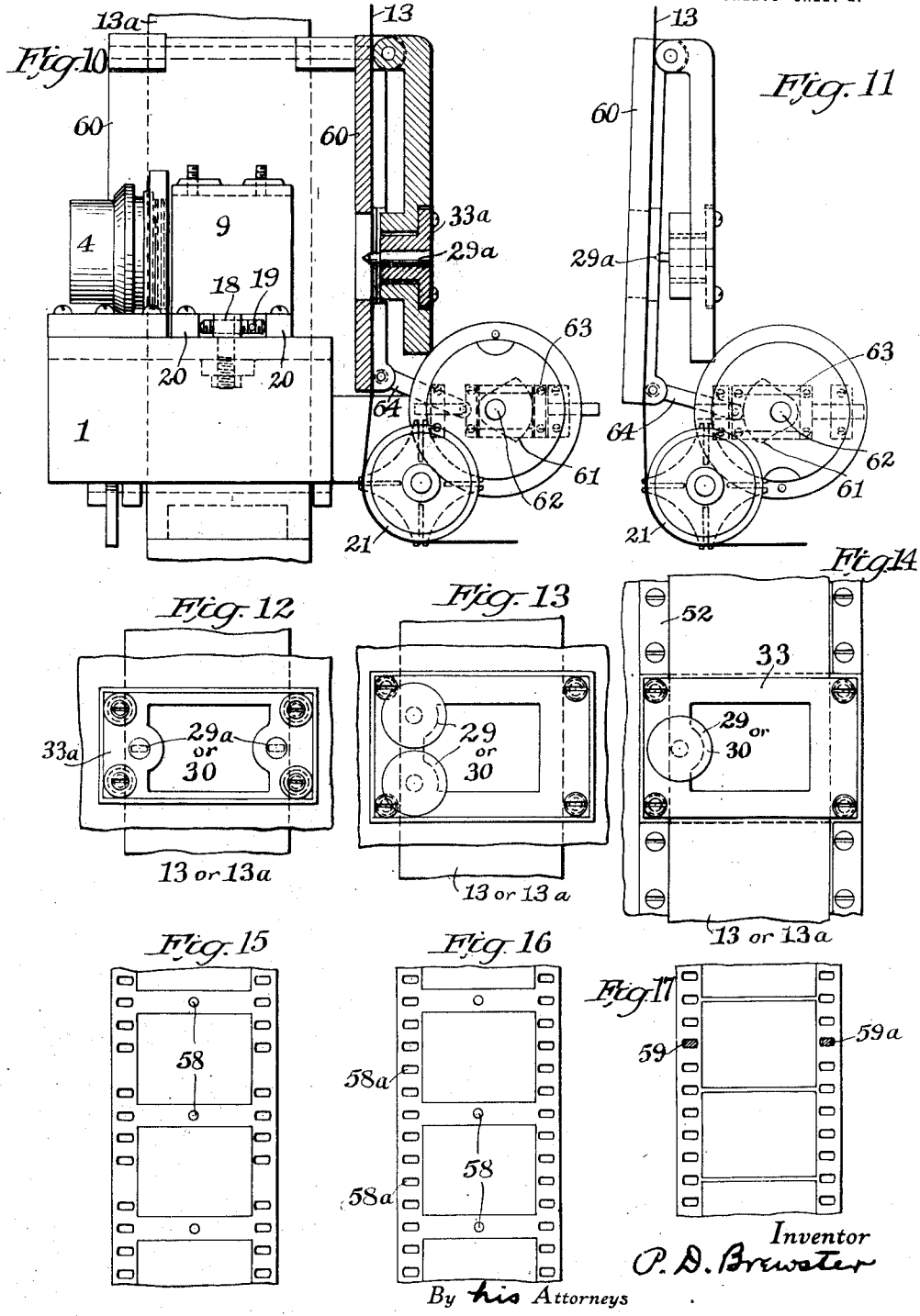

PERCY DOUGLAS BREWSTER, OF EAST ORANGE, NEW JERSEY.

METHOD FOR COLOR CINEMATOGRAPHY.

1,359,024.   Specification of Letters Patent.   Patented Nov. 16, 1920.

Original application filed June 29, 1918, Serial No. 242,539. Divided and this application filed December 27, 1919. Serial No. 347,756.

*To all whom it may concern:*

Be it known that I, PERCY D. BREWSTER, a citizen of the United States of America, residing at East Orange, in the county of Essex and State of New Jersey, have invented certain new and useful Improvements in Methods for Color Cinematography, of which the following is a full, clear, and exact description.

In the art of color cinematography it has been proposed to make two color records, on separate negative films, through color-filters individual to the respective films, for example one series of images or pictures on one of the films taken through a red filter and the other series on the other film taken through a green filter; and then by contact to print the two series on the opposite sides of a positive film which is sensitized on both sides. The positive film is then developed and fixed, and the images on the two sides are stained or colored, say red on one side and green on the other, so that when the two images are projected (of course simultaneously) on the screen a unitary image in substantially natural colors will result. So far as I am aware this method, in which the color records are made on two separate films, has never been successful in practice, however attractive in theory; the reason being the difficulty, heretofore insuperable, of securing accurate enough registry of the images in printing them on the positive film. The necessity for accurate registry will be apparent when it is remembered that if the pictures are out of registry on the positive film the defect, greatly magnified, is evidenced on the screen by red and green color bands or fringes at the edges of the objects photographed.

I have therefore been led to devise my present invention, which has for its chief object to provide an improved method whereby adequate registry can readily be attained. To this and other ends the invention consists in the novel procedure hereinafter described.

In carrying out the invention in the preferred manner a pair of light images of the object to be photographed are projected to separate focal plane areas; two perforated negative films are passed step by step through the respective focal plane areas to bring the successive image- or picture-spaces to the exposure positions and the films are so positioned that at least one selected perforation in each film is in a certain definite and exact relation to the respective light image, this relation being constant throughout the series of steps; and the films are exposed to the light images while in such positions. Then the negative images produced on one film have with respect to their perforations exactly the same constant relation as the images on the other film have to their perforations. Consequently, in subsequent printing by contact on the opposite sides of the positive film, if the perforations in the latter are registered with the perforations in the two negative films, the resulting positive images will be in accurate registry, and when projected will produce a single or unitary image on the screen. The positioning of the negative films in their respective focal plane areas is effected by the use of registry pins, which enter the selected perforations, say one on each side of the film, before the exposure is made, so that if a picture-space on the film has at any step been brought to only an approximately correct exposure position the pins will shift the film in one or more directions, in its own plane, to bring the picture-space exactly to the exposure position.

Usually the same perforations as were used to locate the negative images are then used to register the negative images with each other in printing the positive. I also prefer to use films perforated before exposure with the standard spacing, as I have found that the first class perforating machines now in use give highly accurate results, but it is within the spirit of my invention to use special perforations in each negative film.

Referring to the accompanying drawings, in which the preferred embodiment of the invention is illustrated:

Figure 1 is a sectional plan view of the camera (omitting the usual light-tight casing and the film-feeding mechanism) showing the registry pins in their advanced positions.

Fig. 2 is a side view of the parts shown in Fig. 1, partly in vertical section.

Fig. 2ª is a cross section on the light-splitting device on a plane at right angles to the optical axis of the lens, illustrating a method of tilting the device to raise or lower one of the images.

Fig. 3 is an elevational view of the reflecting and transmitting surface of the light-splitting device by which part of the light from the lens is transmitted to one of the negative films and part reflected to the other.

Fig. 4 is a rear view of one of the registry plates and its pair of registry pins.

Fig. 5 is a detail section, on a larger scale, showing one of the registry pins about to enter the selected perforation in the negative film.

Fig. 6 is a detail front view, on the same scale as Fig. 5, showing the pointed end of one of the registry pins, in its registry plate.

Figs. 7, 8, and 9 are rear views of registry plates, showing different arrangements of the registry plates.

Fig. 10 is a side elevation, partly in section, of a camera in which the registry pins are stationary and the film is moved into engagement with them.

Fig. 11 is a side view of the registry mechanism of Fig. 10, showing the films disengaged from the registry pins.

Fig. 12 is a rear view of the registry plate used in the camera illustrated in Figs. 10 and 11, showing the ends of the registry pins in dotted lines.

Fig. 13 is a rear view of a registry plate with two registry pins, one above the other.

Fig. 14 is a rear view of a registry plate having a single registry pin.

Fig. 15 shows a negative film with certain of the usual perforations omitted and special perforations provided between the successive images.

Fig. 16 shows the same film after it has been reperforated to supply the omitted perforations.

Fig. 17 shows the same film as positioned in the printer, with the special registry pins employed.

The camera illustrated in Figs. 1 and 2 comprises a base 1, on which the sliding front 2 is adapted to be moved (for focusing) between guides 3, 3, by the rack and pinion 5, 6. The lens 4 is carried by the front 2.

The light from the lens enters the splitting prism 7—9, composed of two triangular prisms having their inclined faces 8 cemented together. One of these surfaces is partially silvered, as for example in bands or stripes 10, Fig. 3, so that incident rays striking the silvered portions will be reflected at right angles and pass thence through the filter 11, preferably green, to the "green" film, not shown, while rays striking the unsilvered portion of surface 8 are transmitted and pass through the filter 12, preferably red, to the "red" film 13, Fig. 2. Preferably the prisms used are of the 45° type, but in any case the surfaces from which the rays emerge should be perpendicular to the axial rays and the films should be perpendicular to the same rays. The films used may both be panchromatic, or one may be specially sensitized for the green group of rays, as for example by pinaverdol, and the other for the red group, as by pinacyanol. If the films are specially sensitized I sometimes prefer to use in front of the "green" film 13ª, Fig. 1, a yellow filter, such as the standard $K_2$ or $K_3$, which will sufficiently reduce the action of blue and violet rays on the film. Such a filter is "faster" than any green filter that I know of and thus permits shorter exposures to be made.

The splitting prisms are held firmly on their base 14, Figs. 2 and 2ª, by means of screws 15 in the upper spring clips 16. The base is mounted on a vertical pivot 17 the axis of which is in the plane of the reflecting and transmitting surface 8. The prisms can therefore be rotatively adjusted to shift the reflected image laterally on the film. To make this adjustment easily and accurately the base 14 is provided on one side with a lug (Fig. 1) having a capstan screw 19 working between two stops 20 on the camera bed 1.

By the optical system described above, two separate light-images of the object to be photographed are produced in predetermined areas or parts of two separate focal planes, preferably at right angles to each other.

The two films are fed intermittently through their film gates (which embrace the above-mentioned focal plane areas) by any suitable mechanism, as for example a Lumière or a Geneva movement, one of the latter type being illustrated in connection with the film 13, which is advanced by the sprocket 21. The shaft 22, which is the main driving shaft, rotated manually by means of any convenient mechanism, is connected by bevel gears 23 to shaft 24 which actuates the feeding mechanism (not shown) for the other film.

The cams 25, 26, are mounted on shafts 22, 24, respectively, and are arranged to actuate the rocker arms or levers 27, 28, at the proper times. The registry pins 29, 29, 30, 30, are mounted in guides 31, 31, 32, 32, carried by the registry plates 33, 34, to reciprocate in paths perpendicular to the films. Coil springs 35, 36, urge the pins outwardly against their actuating arms 27, 28, and press the latter firmly against the cams.

The cams 25, 26, are preferably so timed that as soon as the films have been fed down one image space the registry pins are advanced into their respective perforations. In general it is desirable that the pins enter perforations which are as near as possible to the centers of the respective exposure spaces or areas on the films, and I therefore prefer to have the pins in the lines passing horizontally through the points where the axial rays strike the films; the feeding mechanism being constructed so that when the films come to rest a pair of perforations on each film will be opposite the respective registry pins. The feed-mechanism should also maintain the usual loop or slack in the films above the film gates, to permit the films in the film gates to be shifted slightly downwardly or sidewise by the registry pins, and the lower sprockets should be set to leave the centers of the registry perforations (which are entered by the registry pins) slightly above the axis of the pins so that the latter will not be required to raise the film, which, as will be readily understood, is held down by the sprocket and hence cannot move upwardly.

In the claw type of feeding mechanism the claws leave the film at the end of their downward stroke and the film is therefore free. I prefer the Geneva type, however, for the reason that the feeding movement requires only about one-sixth of the revolution of the driving shaft as against a third, more or less, in the Lumière claw type, thus affording ample time for the operation of the registry pins without reducing the period devoted to exposure of the films.

One of the registry pins is illustrated in detail in Figs. 5 and 6. As there shown, each pin comprises a round shank fitting its guide (designated by 31 in Fig. 5) which has an interior guide groove 37 to receive the stud 38 carried by the shank. As shown in Fig. 5, the front portion of the pin is shaped to fit the perforations in the film, and to facilitate its entry into the perforations its point is beveled, preferably with a longer bevel on the underside to give adequate camming effect downward when the film comes to rest (after the operation of the feed mechanism) with the center of the perforation above the axis of the pin.

The pin should advance with its flat surfaces 39, 40, Figs. 5 and 6, truly parallel to the "flats" of the film perforation, in order to avoid possible distortion or other injury to the edges of the perforations; or the pin should be capable of slight rotary movement so as to adjust itself to the perforation. For this reason I prefer to have the pin shank round and make the stud 38 slightly smaller than its keyway 37. The pin is thus maintained in such position that the flat of its taper will engage the flat of the perforation and, if the pin and perforation are not exactly registered, will cam the pin rotatively until the flats make even contact throughout. The pin itself is then rotated to its normal position (that is, to the position which it occupies during the exposure period) by the closely fitting pin-aperture 50, Fig. 5, hereafter more fully described, thereby shifting the film in the film gate to the exposure position. Preferably the registry pins are from .001 to .002 of an inch smaller than the perforations.

From the foregoing it will be seen that before exposure each film is positioned by two selected registry perforations, and that in consequence the images produced by the exposures bear each a definite fixed relation to the registry perforations. In practice the pins for one of the films are carefully set. The relation thus established between the images on that film and the corresponding registry perforations is taken as a standard, and the corresponding relation on the other film is adjusted to conform thereto. My invention contemplates several ways of effecting this adjustment, for example by an optical method, so to speak, in which the image is shifted horizontally or vertically, or in both directions, or by a mechanical method, in which the registry pins which coöperate with one of the films are shifted, or by a combination of both methods.

In the optical method of adjustment illustrated herein the reflected image is shifted laterally in either direction to any desired extent by turning the light-splitting device on its vertical axis by means of the screw 19, as already described. To raise or lower the reflected image one side or the other of the light-splitting device is raised by placing under it one or more shims, not shown. Or screws, as 42, Fig. 2ª, can be provided in the base 14 at each side to raise or lower one side or the other as may be desired. In the mechanical method I prefer to effect the vertical adjustment of the registry pins to raise or lower the registry perforations or shift them laterally relatively to the image in the focal plane by the use of shims 43, 44, and screws 45, 46, Figs. 2, 4 and 5. In practice my procedure has been to make a series of negative pictures on the films and superpose the two films, face to face, registering them by means of pins through the registry perforations. Taking the position of the images on one film relative to the registry perforations as the standard, I measure the vertical and horizontal errors, if any, in the other by means of a microscope in thousandths of an inch, and then substitute for the shims used others of proper thickness to correct the errors. Quick and accurate results are obtained by this method.

The aperture plates 47, Figs. 1, 2 and 5, behind which the films travel, are secured directly to the guide plates 33, 34 (so as to be shifted with the latter when they are adjusted) by means of a dowel 48 and screws 49, Fig. 4, and are provided at each side with pin-apertures 50, Fig. 5, to receive the registry pins. The apertures preferably fit the pins closely.

The pressure plates 51, Figs. 1, 2 and 5, hold the films snugly against the rear surfaces of the aperture plates 47 while the exposures are being made, the registry pins extending through the relatively large openings 52. As the pins advance, the shoulders on the pins meet the springs 53 and by their pressure on the latter press the plates 51 upon the back of the films. At one end, say the top, springs may be fixed to the pressure plates but at the other end are preferably held loosely by the screws, see Fig. 2, to permit free flexure of the springs without cramping the pins.

The shutter 55, Fig. 1, operating in front of the lens to expose and obscure the films, is actuated from shaft 24 by means of the gears 56, 57, in harmony with the movement of the films.

From the foregoing the operation of the camera will be readily understood. The parts being in the position shown in Figs. 1 and 2, the shutter uncovers the lens to make the exposures and then covers it again. The cams 25, 26, rotating in the direction of the arrows and operating through the levers 27, 28, now permit the springs 35, 36 to retract the registry pins 29, 30, thereby releasing the film, after which the lower feed sprockets draw the film down through the space of one picture. The cams then advance registry pins again, which "justify" the films and through the medium of the pressure plates 51 hold them firmly in position, thus bringing the parts again to the positions shown in Figs. 1, and 2, and completing the cycle.

As previously stated, I prefer to arrange the registry pins at the horizontal or transverse center-line of the image space, as in Figs. 2 and 4, but they may be positioned to enter other pairs, as for example the next pair above, as in Fig. 7, or the next below, as in Fig. 8. I also prefer to use corresponding pairs of perforations in the two films, but modern perforating machines are so accurate in operation that the error between their successive perforation is, I have found in practice, entirely negligible, and it is therefore practicable to use different perforations in the two films. For example, I may arrange the registry pins as in Fig. 7 for one film, and as in Fig. 8 for the other. Or I may have one pin below the transverse center-line and one above, as in Fig. 9, or two perforations on the same side of the film may be used, with two pins, one above the other, as 29, Fig. 13. Indeed I may use only one pin as in Fig. 14, but in this case it is well to provide a vertical guide 52 on one side of the film above and below the guide plates, against which guides the film is lightly pressed, to prevent side play or "weave". In fact, with film perforated accurately any perforations may be used, but they should be near the picture space so as to avoid or minimize the effects of shrinkage in development. Still, another method is illustrated in Fig. 16. In the film there shown every fifth perforation on each side is omitted but perforations 58 between the spaces for the picture are provided for the registry pin or pins, which are of course correspondingly arranged in the camera. These intermediate perforations may be of the standard shape and size, or they may be round as shown. In using such a film in a camera employing sprockets to advance the film every fifth tooth on each side of the sprockets is omitted. After developing, fixing and drying, the film is re-perforated to supply the missing perforations, as at 58$^a$, Fig. 16, using the intermediate perforations 58 as guides for the pilot pins in the perforator, and preferably using these new perforations, 58$^a$, for registry in printing.

Inasmuch as developed and fixed film is found, after drying, to have shrunk about one per cent. of its original length I prefer to have the perforations in the undeveloped negative one per cent. farther apart (vertically) than in the unprinted positive, so that in printing the latter (after the negative film has shrunk) the perforations in the two negatives and the positive will match exactly.

If the film has been supersensitized for one or more colors by means of a dye bath after perforating, and has shrunk as a result, I prefer to use in the camera registry pins of the type illustrated in Fig. 17. Here the pin 59 on one side of the film is shaped to fill the perforation, vertically and horizontally; while on the other side the pin 59$^a$ fills the perforation vertically but not horizontally, to prevent any slight bending of the film in its own plane.

In the camera illustrated in Figs. 10 and 13, inclusive, the registry pins, as 29$^a$, are not reciprocated but are stationary and the films are slipped on and off the pins, the entire film for a suitable distance above and below the pins being swung clear of the pins before it is fed down for the next exposure. For this purpose the films, as 13, 13$^a$, fed down step-by-step by the feed sprockets, pass through swinging film gates 60, pivoted at the top. The cam 61, fixed on the shaft 62 (corresponding to shaft 22 in Figs. 1 and 2), works in and reciprocates a frame 63 which is connected to bottom of the film gate by a link 64. It will be understood that similar feeding mechanism, with a similar cam, frame and link, is provided in conjunction with the other film gate. The parts being in the position shown in Fig. 10, the shutter (not shown) makes the exposure. The cams then advance the frames, which swing the film gates forwardly, carrying the films off the registry pins. The feed sprockets now draw the films down one picture space and come to rest, after which the cams retract the film gates and bring the next registry perforations in the films into engagement with the pins, thus completing the cycle and leaving the films accurately positioned for the next exposure. As in the other cameras illustrated, the light splitting device is adjustable to correct the relative positions of the images in the focal planes by the optical method described, and the registry or guide plates, as 33ª, are adjustable vertically and horizontally (preferably by the use of shims, not shown) to make the correction by the mechanical method.

It is within the spirit of my invention to use two lenses, one for each film, instead of a single lens as in Figs. 1 and 10. Also the two exposures (to make an image pair or group) may be made one after the other instead of simultaneously. In place of exposing two negative films a single film of double width may be used and the images made side by side. After exposure the negative can be split lengthwise to form two separated color records, if desired, or its images can be printed on the two sides of the positive without splitting the negative in two. For three-color cinematography three separate negative films may be used.

This application is a division of my copending application Serial No. 242,539, filed June 29, 1918.

It is to be understood that the invention is not limited to the specific details herein illustrated and described but can be practised in other ways without departure from its spirit.

I claim:

1. The method of making negatives for color cinematography which comprises projecting light-images of the object to be photographed to fixed positions in separate focal plane areas, feeding perforated films intermittently through the respective focal plane areas, shifting the films during a part of each time interval between successive feed movements to bring perforations in said films into predetermined fixed positions, and exposing the films to the respective light images while at rest between successive feed movements.

2. In the art of making negatives for color cinematography, the improvement comprising projecting light-images of the object to be photographed to constant positions in separate focal plane areas, feeding perforated films intermittently through the respective focal plane areas and shifting the films to bring perforations therein into predetermined constant positions, and exposing the films to the respective light-images while in such positions.

3. In the art of making negatives for color cinematography, the improvement comprising projecting a pair of light-images of the same object to separate focal plane areas; passing a pair of perforated films step by step through the respective focal plane areas and shifting the films to bring perforations in the films, at least one in each, into predetermined constant and exactly similar positions relative to the light-images in the respective focal plane areas; and exposing the films to the respective light-images while in such positions.

4. In the art of making negatives for color cinematography, the improvement comprising projecting to separate focal plane areas light-images of the object to be photographed, feeding a pair of films step by step through the respective focal plane areas to bring to approximate exposure-positions successive picture-spaces on the films and shifting the films in said focal plane areas to bring the approximately positioned picture-spaces into constant and exactly similar exposure-positions relative to the respective light-images, and exposing the films to the respective light-images while in such exactly similar positions.

5. In the art of color cinematography, the improvement comprising feeding a plurality of sensitized surfaces to approximate exposure positions, shifting the surfaces from such approximate exposure positions to registry exposure positions, maintaining the said surfaces in such registry positions during exposure, and exposing said surfaces.

6. In the art of making negatives for color cinematography, the improvement comprising passing a plurality of sensitized surfaces through separate focal plane areas, shifting the said surfaces horizontally and vertically in their respective focal plane areas into registry positions in said focal plane areas, and exposing said surfaces.

7. In the art of making negatives for color cinematography, the improvement comprising passing a plurality of sensitized perforated surfaces through separate focal plane areas step by step, shifting the said surfaces at each step to bring selected perforations into registry with each other at said areas, and exposing said surfaces at each step.

In testimony whereof I hereunto affix my signature.

PERCY DOUGLAS BREWSTER.